United States Patent [19]

Blankers

[11] Patent Number: 5,068,572
[45] Date of Patent: Nov. 26, 1991

[54] SWITCH MODE POWER SUPPLY

[75] Inventor: Hendrik J. Blankers, Eindhoven, Netherlands

[73] Assignee: U.S. Philips Corporation, New York, N.Y.

[21] Appl. No.: 524,251

[22] Filed: May 15, 1990

[30] Foreign Application Priority Data

Jun. 8, 1989 [NL] Netherlands .................. 8901459

[51] Int. Cl.⁵ ........................................... H05B 41/36
[52] U.S. Cl. ................................ 315/209 R; 315/224; 315/307; 315/DIG. 7
[58] Field of Search ............... 315/209 R, 200 R, 224, 315/226, 307, DIG. 5, DIG. 7, 362; 363/74, 80, 131

[56] References Cited

U.S. PATENT DOCUMENTS 4,441,053  4/1984  Daspit .......................... 315/307 X
4,485,434 11/1984  Beeston et al. ............. 315/DIG. 7 X
4,594,531  6/1986  Ganser et al. ...................... 315/307

FOREIGN PATENT DOCUMENTS 8123254  7/1981  United Kingdom .

Primary Examiner—Eugene R. LaRoche
Assistant Examiner—Ali Neyzari
Attorney, Agent, or Firm—Bernard Franzblau

[57] ABSTRACT

A switched mode power supply for ignition and operation of a high-pressure discharge lamp (5). The switched mode power supply comprises a switching device (1), an inductor (2), capacitive buffer (3) and a rectifier (4) for producing a current through the lamp from an input voltage. In order to supply a switching signal to the switching device, the switched mode power supply is further provided with a control circuit (I). A detector circuit (20) provides current detection of the inductor current and at the same time serves to produce the switching signal.

14 Claims, 2 Drawing Sheets

SWITCH MODE POWER SUPPLY

BACKGROUND OF THE INVENTION

This invention relates to a switch mode power supply suitable for the ignition and operation of a high-pressure discharge lamp comprising switching means, induction means, capacitive buffer means and rectifying means for producing from an input voltage a current for the lamp by switching the switching means alternately to the conducting and to the non-conducting state, and a control circuit for supplying a switching signal comprising a switching-on signal for switching the switching means to the conducting state and a switching-off signal for switching the switching means to the non-conducting state.

Such a switch mode power supply is known from GB-2,102,641. The switching signal is produced in the control circuit by a separate oscillator. In order to obtain a supply of current to the lamp as constant as possible, the known switch mode power supply is provided with circuit means for the detection of the current through the switching means. The circuit means ensure that the current through the switching means is limited to a maximum value by interrupting the production of the switching signal as soon as the maximum current is detected. As a result, the switching means pass to the non-conducting state.

A disadvantage of the known switch mode power supply is that both current detection means and a separate oscillator are required. Thus, the construction of the switch mode power supply becomes fairly complex. The invention has for its object, inter alia, to provide a comparatively simple construction for a switch mode power supply while still limiting the current supply to the lamp.

SUMMARY OF THE INVENTION

For this purpose, according to the invention, a switch mode power supply of the kind mentioned in the opening paragraph is characterized in that the switch mode power supply comprises circuit means for current detection by the induction means, these circuit means serving at the same time for producing the switching signal.

An advantage of the switch mode power supply according to the invention is that the use of a separate oscillator is no longer necessary. Detection of the current through the induction means instead of through the switching means has the further advantage that the limitation of the current supply is not solely restrained to the limitation to a maximum value.

In a preferred embodiment of the switch mode power supply according to the invention, the circuit means comprise a first winding part of the inductive means as a source for producing the switching-on signal. Likewise, in a further embodiment, the circuit means comprise a second winding part of the induction means as a first signal source for producing the switching-off signal. In a very simple and effective manner, the production of the switching signal is coupled to current detection in the induction means. In a further improvement of the switch mode power supply according to the invention, the circuit means also comprise capacitive means, which constitute with the induction means an oscillatory circuit for driving the source for producing the switching-on signal. This makes it possible to obtain a highly reproducible detection in a simple manner. Especially the transition from a current decrease to a current increase is a suitable criterion for detection.

Preferably, the control circuit of the switch mode power supply according to the invention comprises a bistable multivibrator controlled by means of the first signal source and serving to produce the switching-off signal. This has, inter alia, the advantage that the switching-off signal can be produced by comparatively simple means, which are particularly suitable for miniaturization.

In a further advantageous embodiment, the circuit means comprise a second signal source dependent upon the lamp voltage for controlling the multivibrator. This makes it possible to not only limit the supply of current to the lamp by means of of current detection, but it can also be controlled as a function of the lamp voltage. This has the advantage that by means of the switch mode power supply the power supplied to the lamp can be controlled.

BRIEF DESCRIPTION OF THE DRAWINGS

An embodiment of a switch mode power supply according to the invention will be described with reference to the accompanying drawing. In the drawing.

DESCRIPTION OF THE PREFERRED EMBODIMENTS

Figure 1:
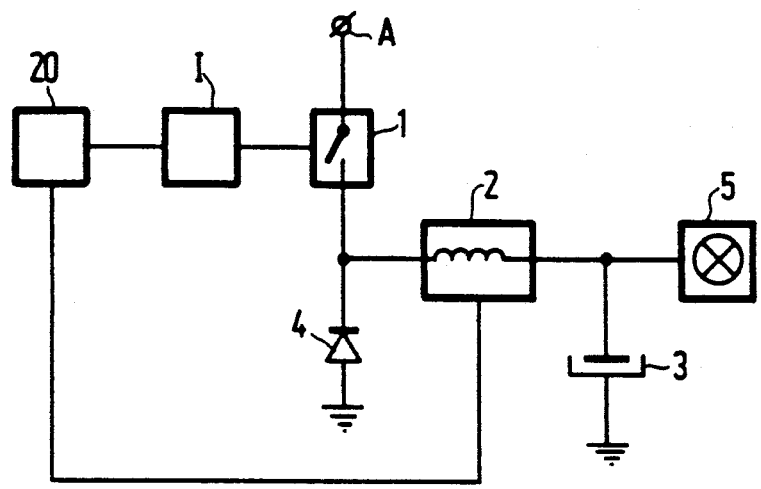
FIG. 1 shows a principle circuit diagram of the switch mode power supply.

In FIG. 1, reference symbol A denotes a connection terminal for an input voltage. By means of switching means 1, induction means 2, capacitive buffer means 3 and rectifying means 4, a current for a lamp 5 is produced from the input voltage. The lamp 5 can be directly connected to the output terminal B. It is also possible for the lamp to be included in a commutation network connected to the output terminal B. The current is produced by switching the switching means 1 alternately to the conducting state and to the non-conducting state. The switching means 1 are switched by a switching signal, which is supplied of by a control circuit I. Circuit means 20 provide current detection of the current in the induction means 2 and serve at the same time for producing the switching signal. The example considered is a switch mode power supply of the down converter type. In the conducting state of the switching means 1, the switching means constitute together with the induction means 2 and the capacitive buffer means 3 a main current circuit. In the non-conducting state of the switching means 1, the main current circuit is constituted by the rectifying means 4, the induction means 2 and the capacitive buffer means 3.

Figure 2:
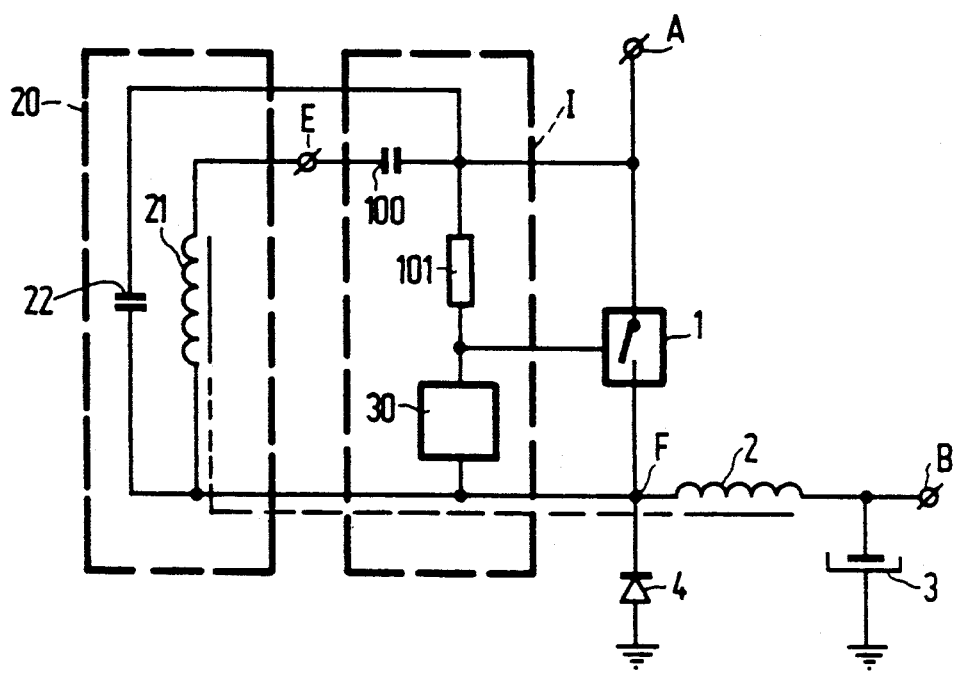
FIG. 2 shows partly in detail a part of the circuit diagram of FIG. 1 for producing the switching-on signal.

In FIG. 2, a part of the circuit means is indicated relating to the production of the switching-on signal. A first winding part 21 consists of an auxiliary winding of the induction means 2 (in the form of a choke coil) and constitutes both the current detection means and the source for producing the input signal. The voltage produced in the auxiliary winding 21 is supplied to the switching means 1 via a coupling capacitor 100 and an impedance 101 of the control circuit. Reference numeral 30 denotes the part of the control circuit which relates on the one hand to the supply of the switching-off signal and on the other hand to the means for maintaining a switching condition of the switching means.

The circuit means further comprise capacitive means represented as a capacitor 22, which constitute with the choke coil 2 an oscillatory circuit for driving the auxiliary winding 21 acting as a source.

When the switching means 1 have been switched to the non-conducting state, a current decreasing in value will permanently flow through the choke coil 2 via the rectifying means 4 in the form of a diode. From the instant at which the current through the choke coil 2 has become zero, further conduction via the diode 4 is impossible. However, via the capacitor 22 at the same time a current conduction path is formed so that an oscillatory circuit comprising the choke coil 2 and the capacitor 22 is obtained. As soon as the current through the choke coil 2 increases again due to oscillation of the oscillatory circuit, a positive voltage is induced in the auxiliary winding 21. This voltage supplies via the coupling capacitor 100 and the resistor 101 the switching-on signal to the switching means 1. Thus, the auxiliary winding 21 forms the source for producing the switching-on signal.

Figure 3:
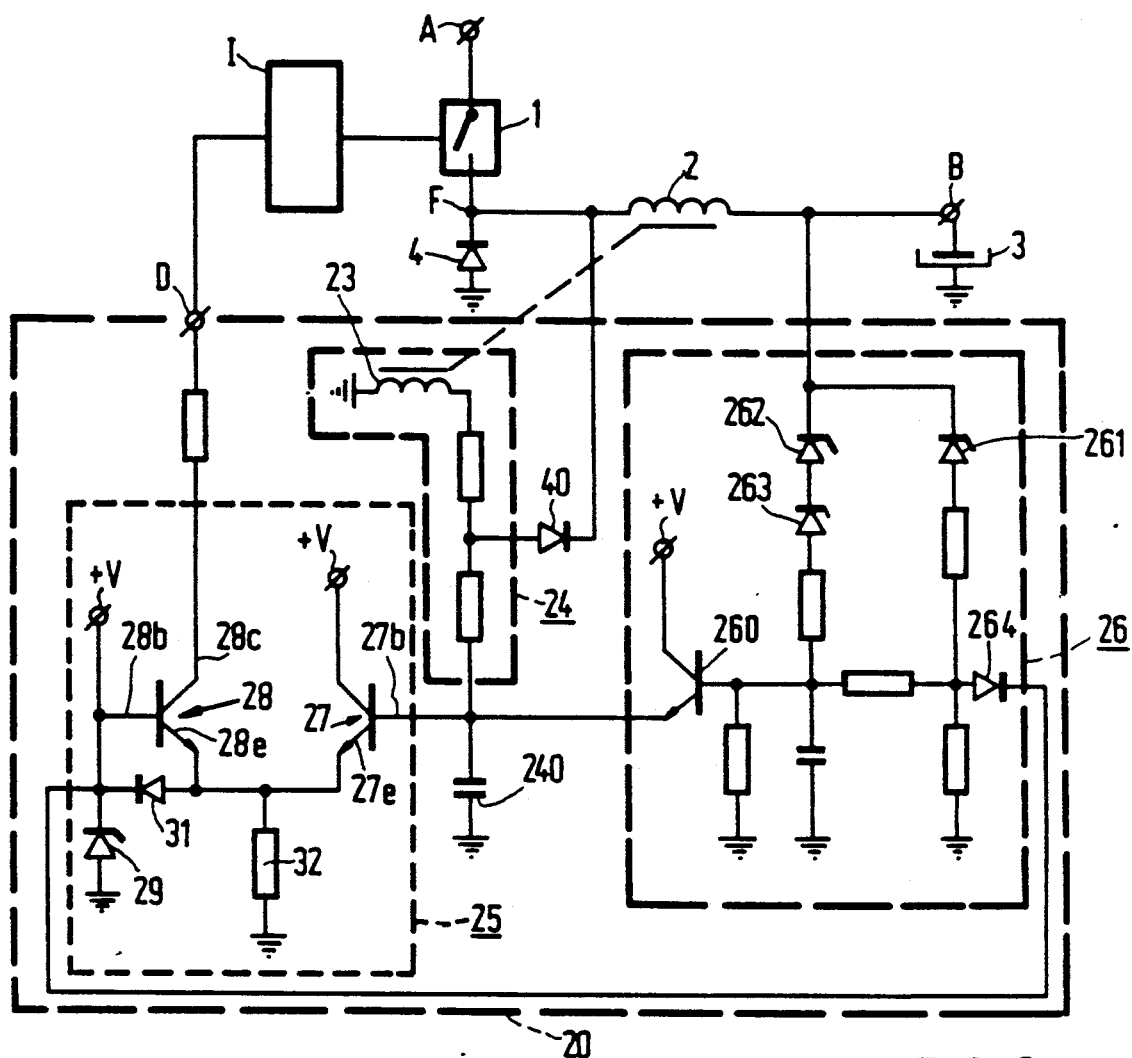
FIG. 3 shows partly in detail a part of the circuit diagram of FIG. 1 for producing a switching-off signal.

The part of the circuit means 20 for producing the switching-off signal is shown more fully in FIG. 3. A second winding part in the form of an auxiliary winding 23 of the choke coil 2 forms a part of a current source 24, by which a capacitor 240 is charged. The capacitor 240 is connected to a base 27b of a bipolar transistor 27, which forms part of a bistable multivibrator 25. By increasing the number of different breakdown voltage adjustments in the voltage division network 26, the lamp voltage dependence upon the signal produced in the voltage division network 26 can be subdivided. In the embodiment shown, this is achieved in an efficient manner in that for a further breakdown voltage adjustment the Zener diode 29 already present is used. For this purpose, the voltage division network 26 is connected via a diode 264 to the Zener diode 29.

The multivibrator 25 comprises a current source constituted by a transistor 28, of which a collector 28c is connected to the control circuit I. An emitter 28e of the transistor 28, coupled to an emitter 27e of the transistor 27, is connected to ground via a common resistor 32. The transistor 27 is supplied by an auxiliary voltage +V. A base 28b of the transistor 28 is also connected to the auxiliary voltage +V and is further connected via a Zener diode 29 to ground. The emitter 28e and the base 28b are interconnected through a diode 31.

The capacitor 240 is also connected to the voltage division network 26, which is connected to the output terminal B. The voltage division network 26 is provided with a transistor 260 as impedance adaptation with the capacitor 240. Further, the transistor 260 prevents the capacitor 240 from being discharged via the voltage division network 26. The voltage division network provides a voltage at the capacitor 240 which is related to the voltage at the output terminal B. In the embodiment considered, the voltage division network 26 comprises a first branch provided with a Zener diode 261 and a second branch provided with Zener diodes 262 and 263.

Due to the different breakdown voltage adjustments for the first and second branches of the voltage division network 26, that the network acts as a signal source dependent upon the lamp voltage. Via the capacitor 240, the multivibrator 25 is then controlled.

This embodiment of the switch mode power supply is constructed so that in the conducting state of the switching means 1 the transistor 28 is conducting. The current flowing through the choke coil 2 induces a voltage in the auxiliary winding 23 and the capacitor 240 is charged thereby via the current source 24. The voltage at the base 27b of the transistor 27 then increases and provides an increasing current through the transistor 27 and hence an increasing voltage at the emitter 27e and so at the emitter 28e of transistor 28. As soon as the voltage at the emitter 28e becomes equal to the voltage at the base 28b, the transistor 28 is switched to the non-conducting (cut off) state and the multivibrator is triggered. Thus, the switching-off signal is formed. When the transistor 28 is switched to the non-conducting state, the amplitude of the current through the coil is limited to a maximum. The maximum amplitude is also determined by a voltage originating from the voltage division circuit 26. For the period in which the switching means 1 are in the non-conducting state, the capacitor 240 will be discharged via a diode 40 through the coil 2 until the voltage across the capacitor 240 is equal to the voltage originating from the voltage division circuit 26. The control circuit I is designed so that, when the switching-on signal is supplied, the multivibrator is also triggered and the transistor 28 again becomes conductive.

Figure 4:
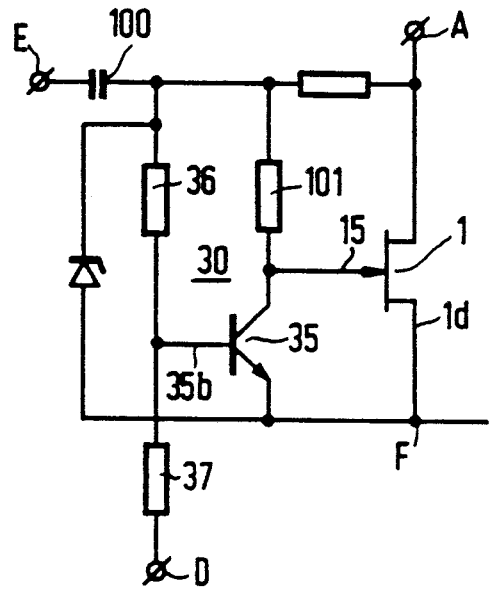
FIG. 4 shows in detail a control circuit as shown in FIG. 1.

In the embodiment considered, the control circuit is constructed in the manner shown in FIG. 4. In the switching means 1, which is constructed as a FET, a control electrode 15 is connected through a transistor 35 to a main electrode 1d. The control electrode 15 is also connected through the impedance 101 and the capacitor 100 to the connection point E, at which point appears the switching-on signal produced by the circuit means 20 described above. A base 35b of the transistor 35 is connected to a tapping point on a voltage division circuit 36, 37, which is connected on the one hand to the capacitor 100 and on the other hand to the connection point D. At the connection point D the switching-off signal produced in the circuit means 20 appears. The circuit parts 35, 36 and 37 constitute the essential parts of the part 30 of the control circuit relating on the one hand to the supply of the switching-off signal and on the other hand to the means for maintaining a switching condition of the switching means 1. This will be explained more fully hereinafter.

The positive voltage appearing as the switching-on signal at the connection point E and produced in the circuit means is supplied via the capacitor 100 and the resistor 101 to the control electrode 15, as a result of which the FET 1 passes to the conducting state. This positive voltage also ensures that the transistor 28 of the multivibrator 25 becomes conductive via the voltage division circuit 36, 37 and the connection point D. The multivibrator is then triggered.

Due to the fact that the transistor 28 becomes conductive, the voltage at the base 35b of the transistor 35 increases and the transistor 25 becomes non-conductive. As long as the transistor 28 of the multivibrator 25 is conducting, the transistor 35 remains in the non-conductive state and hence the FET 1 remains in the conductive state.

As soon as the multivibrator 25 is triggered and the transistor 28 is switched to the non-conductive state, the voltage at the base 35b of the transistor 35 increases. The transistor 35 thus becomes conductive and thus shortcircuits the control electrode 15 and the main electrode 1d. Due to the shortcircuit between the control electrode 15 and the main electrode 1d, the FET 1 is switched to the non-conductive state. Thus, the transistor 35 supplies the switching-off signal appearing at the connection terminal D to the switching means 1.

Until the instant at which the switching-on signal appears at the connection point E, the transistor 35 remains conductive and hence the FET 1 remains in the nonconductive state.

In this configuration of the control circuit, it is achieved in a particularly simple and effective manner that the switching signal produced in the circuit means 20 is supplied to the switching means 1, while at the same time the switching condition of the switching means 1 in the period between the switching-on signal and the switching-off signal and between the switching-off signal and the switching-on signal, respectively, can be maintained with certainty. The transistor 35 thus is a part of a means of maintenance in the form of a switching shortcircuit means having a very simple and reliable construction, which is a further advantage of the described configuration of the control circuit. As protection for the switching means 1, an overvoltage protection may form a part of the maintenance means, for example, in the form of a Zener diode (not shown) parallel In a practical embodiment of the example considered, the switching means 1 are constructed as a FET. The switch mode power supply is suitable for an input voltage of 150 to 190 V and is intended for ignition and operation of a high-pressure metal halide lamp having a nominal power of 200 W. The stable working-point of this lamp lies at 60 V, 3.3 A. The lamp is included in a commutation network.

The induction means 2 are constructed as a choke coil consisting of a coil winding having 33 and 34 turns, respectively, an auxiliary winding comprising 8 turns as a first winding part 21 and an auxiliary winding comprising 17 turns as a second winding part 23.

The Zener diode 261 of the first branch of the voltage division network 26 has a Zener voltage of 27 V (type BZX 84). The Zener diodes 262 and 263 of the second branch have in all a Zener voltage of 106 V (both of the type BZX 84). The Zener diode 29 has a Zener voltage of 6.2 V, while the auxiliary voltage +V amounts to 12 V. The transistor 28 of the bistable multivibrator 25 is of the type BF 622 and is suitable for a collector-emitter voltage of 200 V.

Figure 5:
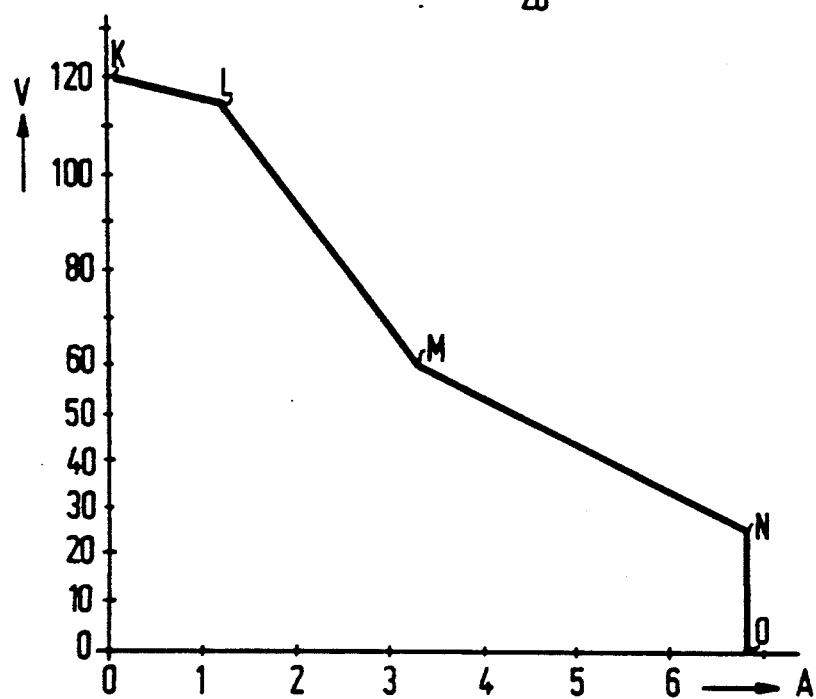
FIG. 5 shows a current-voltage characteristic as obtained by the switch mode power supply shown in FIG. 1.

With the practical construction of the embodiment considered of the switch mode power supply, a current-voltage characteristic as shown in FIG. 5 is obtained. The current supplied to the lamp is plotted on the abscissa and the voltage at the output terminal B is plotted on the ordinate. The voltage at the output terminal B is limited to 120 V (point K in FIG. 5). With an increasing current, the line part K-L is followed. A voltage of 115 V and a current of 1.5 A correspond to the point L. The line part L-M and the line part M-N together form the part of the characteristic in which the power supplied to the lamp is regulated by means of the signal produced in the voltage division network 26, the subdivision into the two line parts being obtained by the breakdown voltage of the Zener diode 29. The point M corresponds to a voltage of 60 V and to a current of 3.3 A, while the point N corresponds to a voltage of 26 V and to a current of 6.8 A. A current of 6.8 A constitutes at the same time the maximum value of the current supplied to the lamp by the switching supply.

Prior to the ignition of the lamp a current will not yet be supplied. In the characteristic, this corresponds to the point K as the working-point of the switching supply. During the ignition, which takes place by means of a starter, not shown, initially a small current will be supplied. In the characteristic, this is indicated by the line part K-L. The commutation circuit in which the lamp is included then operates in a starting mode. As soon as breakdown occurs in the lamp due to starting pulses produced by means of the starter, the commutation circuit passes to the operating mode. Due to the breakdown, the voltage across the lamp becomes very low. In the characteristic, the working-point of the switch mode power supply is then displaced abruptly from the line part K-L to the line part N-0. Subsequently, the voltage across the lamp slowly increases until the stable operating condition is reached. In the characteristic shown, the working-point is displaced from the line part N-0 via the line part N-M to the point M, which corresponds to the stable working-point of the lamp in operation. In the case in which the voltage across the lamp associated with the stable working-point of the lamp is higher than 50 V, the working-point of the switch mode power supply will be displaced in the characteristic shown over the line part M-L.

The lamp thus operated with the switch mode power supply described has at constant power a luminous flux of substantially constant value and is thus suitable, inter alia, for use as a light source for projection purposes.

I claim:

1. A switch mode power supply for ignition and operation of a high-pressure discharge lamp comprising:
   switching means, induction means, capacitive buffer means and rectifying means coupled together to form a switch mode power supply coupled between an input voltage terminal and the lamp so as to supply a current to the lamp from an input voltage at the input terminal by switching the switching means alternately to a conducting state and to a non-conducting state,
   a control circuit for supplying to a control terminal of the switching means a switching signal comprising a switching-on signal for switching the switching means to the conducting state and a switching-off signal for switching the switching means to the non-conducting state, and
   circuit means, which include said induction means, coupled to the control circuit, said circuit means providing current detection of a current in the induction means and at the same time producing the switching signal, where the circuit means further comprise a first winding part of the induction means operative as a source for producing the switching on signal.

2. A switch mode power supply as claimed in claim 1, wherein the circuit means also comprise capacitive means which, together with the induction means, from an oscillatory circuit for driving the source for producing the switching-on signal.

3. A switch mode power supply as claimed in claim 1, wherein the circuit means comprise a second winding part of the induction means operative as a first signal source for producing the switching-off signal.

4. A switch mode power supply as claimed in claim 6, wherein the control circuit comprises a bistable multivibrator controlled by the first signal source.

5. A switch mode power supply as claimed in claim 4, wherein the circuit means comprise a second signal source dependent upon the lamp voltage for controlling the multivibrator.

6. A switch mode power supply as claimed in claim 2, wherein the circuit means comprise a second winding part of the induction means operative as a first signal source for producing the switching-off signal.

7. A switch mode power supply as claimed in claim 6, wherein the control circuit comprises a bistable multivibrator controlled by the first signal source.

8. A switch mode power supply as claimed in claim 7, wherein the circuit means comprise a second signal source dependent upon the lamp voltage for controlling the multivibrator.

9. A switched mode power supply for a discharge lamp comprising:
an input terminal for the supply of a DC voltage, an output terminal for connection to a discharge lamp, a controlled semiconductor switching means, inductor means, a capacitor, a rectifier, means coupling said semiconductor switching means,
said inductor means, the capacitor and the rectifier together to form a switched mode power supply coupled to said input and output terminals thereby to supply a current to a lamp when connected to said output terminal by alternately switching the semiconductor switching means into conduction and into cut-off in response to a switching signal applied to a control terminal of the semiconductor switching means, and
a switch control circuit having an output coupled to said control terminal of the semiconductor switching means to supply thereto said switching signal, wherein the switching control circuit includes circuit means responsive to current flow in the inductor means for generating said switching signal, and wherein
said inductor means comprise a first winding which is a part of the switched mode power supply and a second winding coupled thereto and a part said circuit means so as to derive a switch-on part of the switching signal that drives the semiconductor switching means into conduction.

10. A switched mode power supply as claimed in claim 9 wherein the circuit means further comprise a second capacitor coupled to the second winding to form therewith a resonant circuit to derive said switch-on part of the switching signal.

11. A switched mode power supply as claimed in claim 10 wherein said inductor means further comprises a third winding coupled to the first winding and connected in said circuit means so as to operate as a signal source to derive a switch-off part of the switching signal that drives the semiconductor switching means into cut-off.

12. A switched mode power supply as claimed in claim 11 wherein the circuit means comprise a second signal source which is dependent upon the voltage at said output terminal and is operative to further control the switch-off part of the switching signal as a function of lamp voltage.

13. A switched mode power supply as claimed in claim 12 wherein said circuit means further comprise a bistable multivibrator controlled by the first and second signal sources.

14. A switched mode power supply as claimed in claim 9 wherein said switch-on part of the switching signal is controlled only by current flow in the first winding of the inductor means.

* * * * *

UNITED STATES PATENT AND TRADEMARK OFFICE
CERTIFICATE OF CORRECTION

PATENT NO. : 5,068,572
DATED : November 26, 1991
INVENTOR(S) : H. J. Blankers It is certified that error appears in the above-identified patent and that said Letters Patent is hereby corrected as shown below:

Claim 1, col. 6, line 56, change "where" to --wherein--.

Claim 2, col. 6, line 62, change "from" to --form--.

Claim 4, col. 7, line 1, change "6" to --3--.

Signed and Sealed this

Thirtieth Day of November, 1993

Attest:

BRUCE LEHMAN

Attesting Officer

Commissioner of Patents and Trademarks